A. T. HATCHER.
COTTON-PLANTER.
No. 175,088.  Patented March 21, 1876.
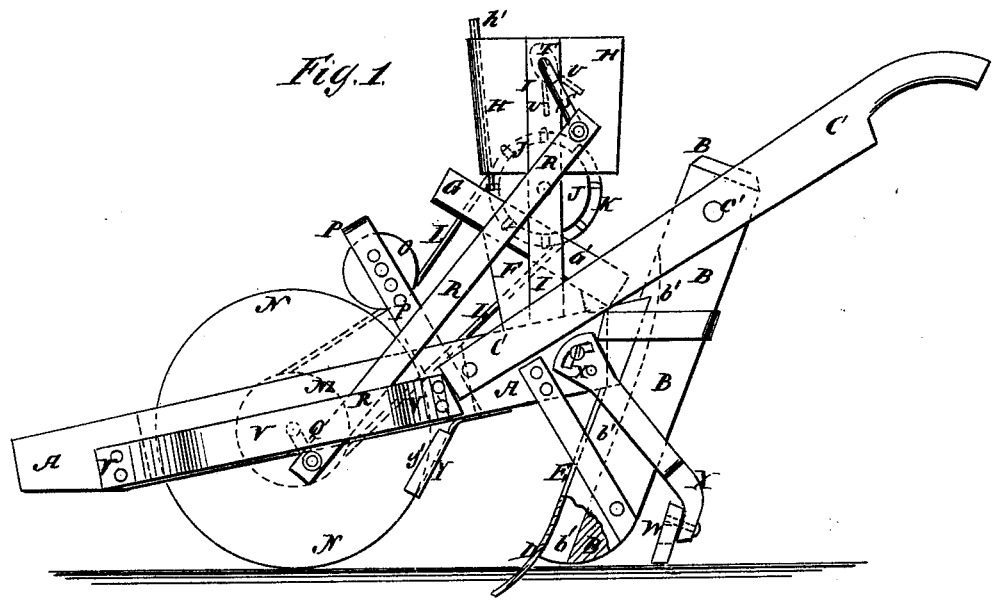
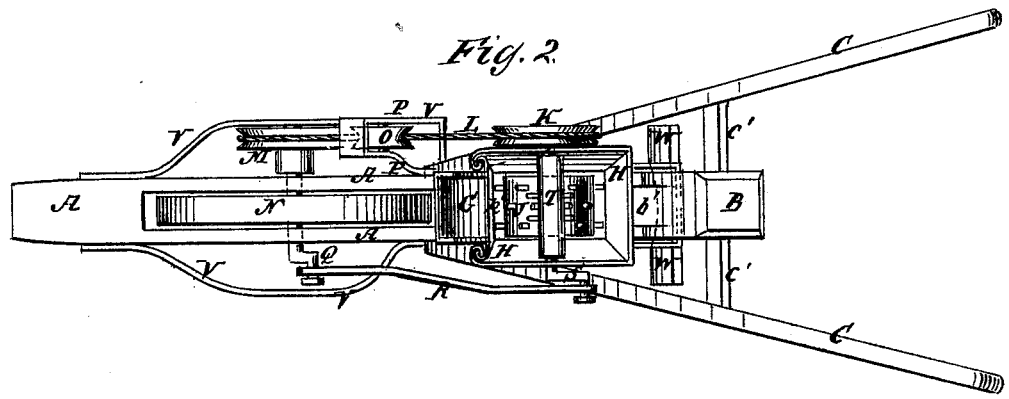
WITNESSES:
E. Wolff
Alex F. Roberts
INVENTOR:
Augustus T. Hatcher
BY
ATTORNEYS.

UNITED STATES PATENT OFFICE.

AUGUSTUS T. HATCHER, OF MANSFIELD, LOUISIANA.

IMPROVEMENT IN COTTON-PLANTERS.

Specification forming part of Letters Patent No 175,088, dated March 21, 1876; application filed December 18, 1875.

*To all whom it may concern:*

Be it known that I, AUGUSTUS THOMPSON HATCHER, of Mansfield, in the parish of De Soto and State of Louisiana, have invented a new and useful Improvement in Cotton-Planter, of which the following is a specification:

Figure 1 is a side view of my improved planter. Fig. 2 is a top view of the same.

Similar letters of reference indicate corresponding parts.

The object of this invention is to furnish an improved cotton-planter, the operating mechanism of which may be applied to the stock of an ordinary scooter, and which shall be simple in construction, convenient in use, and reliable in operation; opening a furrow to receive the seed, dropping the seed, and covering it.

The invention consists in the construction and combination of parts hereinafter claimed.

A represents the plow-beam. B is the standard, which is attached to the rear end of the beam A. C are the handles, the forward ends of which are attached to the sides of the beam A. The handles C are connected and supported by a round, $c'$, which passes through and is secured to the upper end of the standard B. In the forward side of the standard B, and extending from its lower end to a little above the beam A, is formed a groove, $b'$, of such a size as to serve as a spout for conducting the seed to the ground. The lower part of the groove $b'$ is covered by the scooter D, which is attached to the forward side of the lower end of the standard B to open the furrow to receive the seed. The groove $b'$, from the upper end of the scooter D to, or nearly to, the beam A, is covered with a plate, E, attached to the forward side of the standard B, to prevent soil from entering the said groove. To the upper side of the rear part of the beam A is attached a block or frame, F, the top of which is inclined to the rearward at an angle of about forty-five degrees, (45°,) and to it is attached a spout, G, the rear end of which connects with the upper part of the groove $b'$, and is designed to conduct the seed into the said groove $b'$. H is the seed-hopper, which is placed above the upper part of the spout or trough G, and is connected with and supported from the beam A by the bars I attached to its sides and to the sides of the said beam. The forward side $h'$, or a part of said forward side, is movable, so that it may be slid up and down to regulate the amount of seed fed out. The bottom of the hopper H is open, and the seed rests upon and is fed out by a toothed roller, J, which is pivoted to the bars I in such a position that its upper side may enter the open bottom of the hopper H. To one of the journals of the toothed roller or cylinder J is attached a small pulley, K, around which passes an endless band, L, which also passes around a small pulley, M, attached to one of the journals of the large wheel N. The wheel N is placed in a slot in the forward part of the beam A, and is made of such a size as to roll along the surface of the ground when the plow D is working in the ground at the proper depth. The tension of the band L is regulated by the idler O, which rests upon it, and is pivoted to the U-bar P, one of the arms of which is made longer than the other, and is attached to the beam A. Several holes are formed in the arms of the bar P to receive the journals of the idler O, so that it may be adjusted as required. To the other journal of wheel N is attached, or upon it is formed, a crank, Q, to which is pivoted the forward end of a connecting-bar, R, the other end of which is pivoted to a crank, S, formed upon or attached to the end of a rod or shaft, T. The rod T is pivoted to the upper part of the hopper H, and to it are attached two, three, or more, downwardly-projecting pins or fingers, U, which keep the seed stirred up and pushed down to the cylinder J, the teeth of which tear apart the seeds bound together by their fibers, and feed said seeds into the spout G, from which they pass to the ground. The crank S is made longer than the crank Q, so that the revolution of the wheel N may only rock the rod T. V are guards placed upon the opposite sides of the beam A, and the ends of which are attached to said beam. The guards V are bent near their ends, so that their middle parts may be upon the outside of the band-wheel M and crank Q, to protect said band-wheel and crank from stumps, trees, and other obstructions. W is the covering-board, the lower edge of which is concaved to round up the soil over the seed. The board W is pivoted at its center to the rear end of an arm, X, so that it may rock vertically, but not laterally, to enable it to rest horizontally upon the ground, even when the machine may be inclined to one side to avoid obstruction. The upper part of the arm X is forked or branched to straddle the standard B, and the rear end of the beam A and the ends of said branches are pivoted to said beam A by a bolt. The ends of the branches of the arm X are widened, and have curved cross-slots formed in them to receive a bolt to fasten the said arm in place when adjusted.

This construction enables the covering-board W to be readily adjusted to cover the seed to any desired depth. To the under side of the beam A, at the rear end of its slot, is attached a scraper, Y, in such a position that its edge may bear upon the face of the wheel N to scrape off any soil that may adhere to said face. The side edges $y'$ of the scraper Y are turned up to overlap the sides of the rim of the wheel N, and scrape off any soil that may adhere to said sides.

Having thus described my invention, I claim as new and desire to secure by Letters Patent—

In a cotton or walking planter, the combination of the open-bottomed hopper H, revolving toothed distributing-cylinder K, rocking tooth agitating-shaft T U, inclined trough or chute G, and hollow or grooved standard B, having plate E and plow D, all constructed and relatively arranged as herein set forth.

AUGUSTUS THOMPSON HATCHER.

Witnesses:
 GEO. H. SUTHERLIN,
 W. C. REYNOLDS.